United States Patent [19]

Buhrke et al.

[11] Patent Number: 5,231,631
[45] Date of Patent: Jul. 27, 1993

[54] ARRANGEMENT FOR REGULATING TRAFFIC IN A HIGH SPEED DATA NETWORK

[75] Inventors: Rolfe E. Buhrke, Westchester; Dennis L. DeBruler, Downers Grove; Vikram Punj, Naperville, all of Ill.

[73] Assignee: AT&T Bell Laboratories, Murray Hill, N.J.

[21] Appl. No.: 853,353

[22] Filed: Mar. 16, 1992

Related U.S. Application Data

[63] Continuation of Ser. No. 394,390, Aug. 15, 1989, abandoned.

[51] Int. Cl.⁵ .......................................... H04Q 11/04
[52] U.S. Cl. ................................. 370/60; 370/94.1; 370/110.1
[58] Field of Search ........................ 370/94.2

[56] References Cited

U.S. PATENT DOCUMENTS

| | | | |
|---|---|---|---|
| 4,677,616 | 6/1987 | Franklin | 370/79 |
| 4,704,716 | 11/1987 | Bowers et al. | 370/84 |
| 4,736,369 | 4/1988 | Barzilai et al. | 370/79 |
| 4,912,702 | 3/1990 | Verbiest | 370/84 |
| 4,965,790 | 10/1990 | Nishino et al. | 370/85.7 |
| 4,965,798 | 10/1990 | Mostafa et al. | 370/79 |
| 4,984,264 | 1/1991 | Katsube | 370/60 |
| 5,014,265 | 5/1991 | Hahne et al. | 370/60 |
| 5,079,762 | 1/1992 | Tanabe | 370/94.1 |

OTHER PUBLICATIONS

P. A. Evans, Review of Version D.O of Proposed IEEE Standard 802.6 (DQDB MAN), (Memo to Members of IEEE 802.6 Working Group), Jun. 26, 1988, pp. 1-63 and 15 unnumbered pages.

R. Sinha, T1S1 Technical Sub-Committee, Broadband Aspects of ISDN, Baseline Document (Draft), Jul. 1988, pp. 1-30.

*Primary Examiner*—Douglas W. Olms
*Assistant Examiner*—Shick Hom
*Attorney, Agent, or Firm*—Werner Ulrich

[57] ABSTRACT

The invention relates to methods and apparatus for regulating traffic in a Broadband Integrated Services Digital Network (B-ISDN). Terminal adapters interface between terminals and the B-ISDN. Whenever a first terminal wishes to transmit a data message to a second terminal, the source adapter, connected to the first terminal, allocates transmit bandwidth for the transmission of the message and sends a request message to a destination adapter, connected to the second terminal, for checking availability of and allocating receive bandwidth. The data message is sent only if bandwidth has been allocated on both ends. Overflow traffic is throttled at the adapters before it enters the network, thereby reducing the number of data cells lost because of the limited storage of the network.

21 Claims, 8 Drawing Sheets

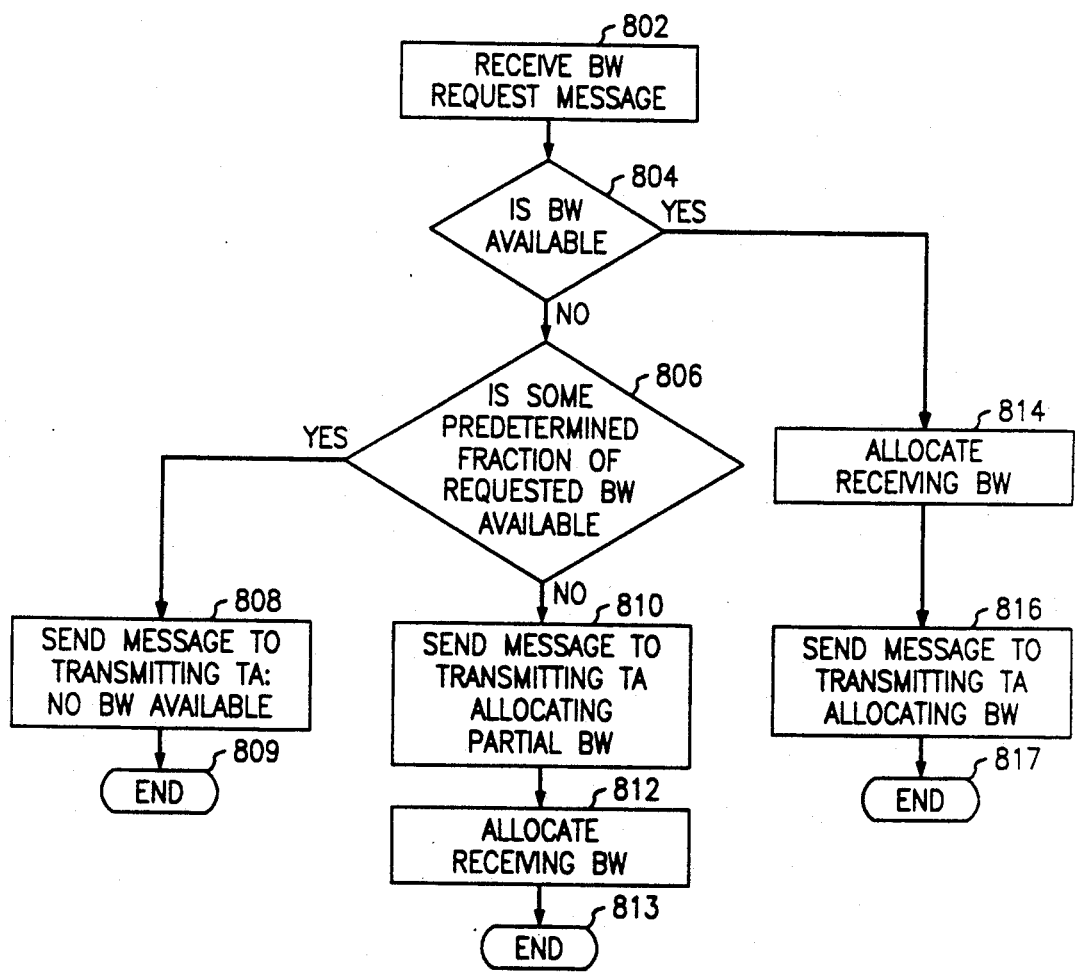

ARRANGEMENT FOR REGULATING TRAFFIC IN A HIGH SPEED DATA NETWORK

This application is a continuation of application Ser. No. 07/394,390, filed on Aug. 15, 1989, now abandoned.

Technical Field

This invention relates to a method and apparatus for controlling overflow traffic in a data network.

Problem

Broadband networks, such as broadband Integrated Services Digital Network (B-ISDN) networks and IEEE 802.6 based metropolitan area networks (MAN), transmit large quantities of high speed data among high speed terminal devices typically using high bandwidth fiber optic systems. The B-ISDN network is described in "Broad Aspects of ISDN-T1S1 Technical Subcommittee", Document T1S1.1/89-200, published by American National Standards Institute (1989), and the 802.6 network is described in "Project 802-Local and Metropolitan Area Networks Proposed Standard", prepared by the IEEE 802.6 Working Group, Jun. 23, 1989. The data is transmitted using an asynchronous transfer mode (ATM) protocol defined by a CCITT standard. A unique characteristic of this protocol is that bandwidth may be dynamically provisioned. In such networks, terminal devices such as computers, local area networks (LANs), computer peripherals and bus extended processors or peripherals, are typically connected to terminal adapters which interface with the B-ISDN switching network. With the ATM protocol, the network transports segmented blocks or cells of data frames from source terminal adapters to destination terminal adapters.

A problem in this type of network is that while the output of each source terminal adapter is limited to the bandwidth of the fiber optic channel connecting that adapter to the B-ISDN network, at any one instant several source terminal adapters may generate a focused load to a particular destination terminal adapter, which destination adapter is then the destination for more data than can be carried by its destination optic fiber channel. In this case, the excess data is temporarily buffered in the network. Network buffers are costly and therefore desirably limited in size. However, after a short period, excess data cells are simply lost. This loss of data cells creates further problems because any lost data cells will have to be retransmitted as part of a much longer message. The result is that any focused overload of more than the briefest period results in an extended overload of the B-ISDN network. The retransmission not only causes further overloads and an increase in the duration of the overload of the network, but substantially degrades performance by delaying the arrival of the messages between source terminal and destination terminal.

A problem of the prior art, therefore, is that there is a need for a better arrangement in a broadband data network for utilizing transmission capabilities efficiently and for preventing temporary overloads that result in inefficient retransmission of data messages.

Solution

The above problem is solved and an advance is made in the art in accordance with the principles of this invention wherein some or all of the bandwidth at an ingress facility and at an egress facility to a data network is allocated for the transmission of a data message before the message is transmitted. The ingress facility is connected to a terminal transmitting the message and the egress facility is connected to a terminal receiving the message. In an illustrative embodiment, before sending a data message or series of messages between an ingress controller and an egress controller, the amount of bandwidth required to transmit the data message efficiently is determined; a determination is then made of the availability of that amount of bandwidth in the ingress controller and the egress controller, and such bandwidth is allocated if available. The ingress and egress controllers are terminal adapters connected to the ingress and egress facilities, respectively. The act of sending a bandwidth allocation request message to the egress or destination terminal adapter only takes place after the bandwidth has been allocated on the outgoing port of the ingress or source terminal adapter. If such bandwidth is available at the source and destination terminal adapters, this bandwidth is allocated in the destination terminal adapter, and the source and destination terminals may then transfer data between their respective terminals via their respective buffers for storing message data. If a source terminal adapter requests bandwidth which is not available either in the source terminal adapter or the destination terminal adapter, that request is stored in a list of requests at the source terminal adapter.

Availability of bandwidth at the source adapter is ascertained directly by accessing memory within the source adapter. Availability of a requested amount of bandwidth at the destination adapter is ascertained by a short high priority signaling message exchange between the source and destination adapters. If the requested bandwidth is available in the destination adapter, that bandwidth is allocated to the requesting source adapter, and the source adapter is informed in a return signaling message. Requests for which bandwidth have not been allocated are periodically sorted and examined and a new attempt is made to allocate bandwidth to the destination, with the older requests receiving preference. The terminal adapter may allocate at any one time as much bandwidth as it has remaining unallocated bandwidth available, and request an allocation of the corresponding destination adapter. If the source adapter receives a negative response from the destination adapter indicating that the destination has not allocated receive bandwidth, the transmit bandwidth allocated for that request is deallocated until a new attempt to allocate is made. A recorded request comprises the amount of bandwidth, the destination, and the time of the request. When the age of a particular request for which bandwidth has not yet been allocated reaches a first threshold, an allocation of the next available block of bandwidth from the source terminal adapter is made for that particular request. Thereafter, the source terminal adapter will repeatedly send request messages to the destination terminal adapter until the destination terminal adapter allocates appropriate bandwidth for receiving from the source terminal adapter, or until the source terminal adapter recognizes that the request has aged beyond a second threshold and times out the request. Advantageously, by limiting the amount of data which is transmitted to each destination terminal adapter, the danger that the broadband network will discard packets within the network is greatly reduced. When all requests cannot be honored, the source terminal adapter discards those messages which cannot be transmitted at that time. Advantageously, by reserving transmission bandwidth of a source terminal adapter, complete messages from source terminals may be transmitted without overloading the source terminal adapter. Advantageously, a backup provision is provided so that, except under conditions of very high overload, messages are not deferred beyond a critical value.

A terminal adapter is used for interfacing between a plurality of terminals and the data network. The terminal adapter is controlled by a program-controlled processor. The program controls the selection of data messages for transmission between storage of the adapter and the network and terminals. The program also controls the allocation of transmit and receive bandwidth, and the generation and transmission of signaling messages for requesting and reporting receive bandwidth allocation. The terminal adapter comprises storage for storing data to be transmitted from terminals to the data network and data received from the data network for transmission to the terminals. In accordance with one aspect of the invention, if the full amount of bandwidth is not available at the receive terminal adapter, a determination is made whether at least some predetermined reasonable fraction, for example, three-quarters, of the full determined bandwidth is available. If so, the available bandwidth is allocated, and the return message requests that the allocated transmit bandwidth be reduced to match the receive bandwidth.

Accordingly, this invention relates to methods and apparatus for transmitting data from a transmitting terminal to a receiving terminal by allocating transmitting and receiving bandwidth to the terminals prior to transmitting data messages between them.

Brief Description of the Drawing

FIGS. 3-8 are flow charts of processes executed in the terminal adapters.

Detailed Description

Figure 1:
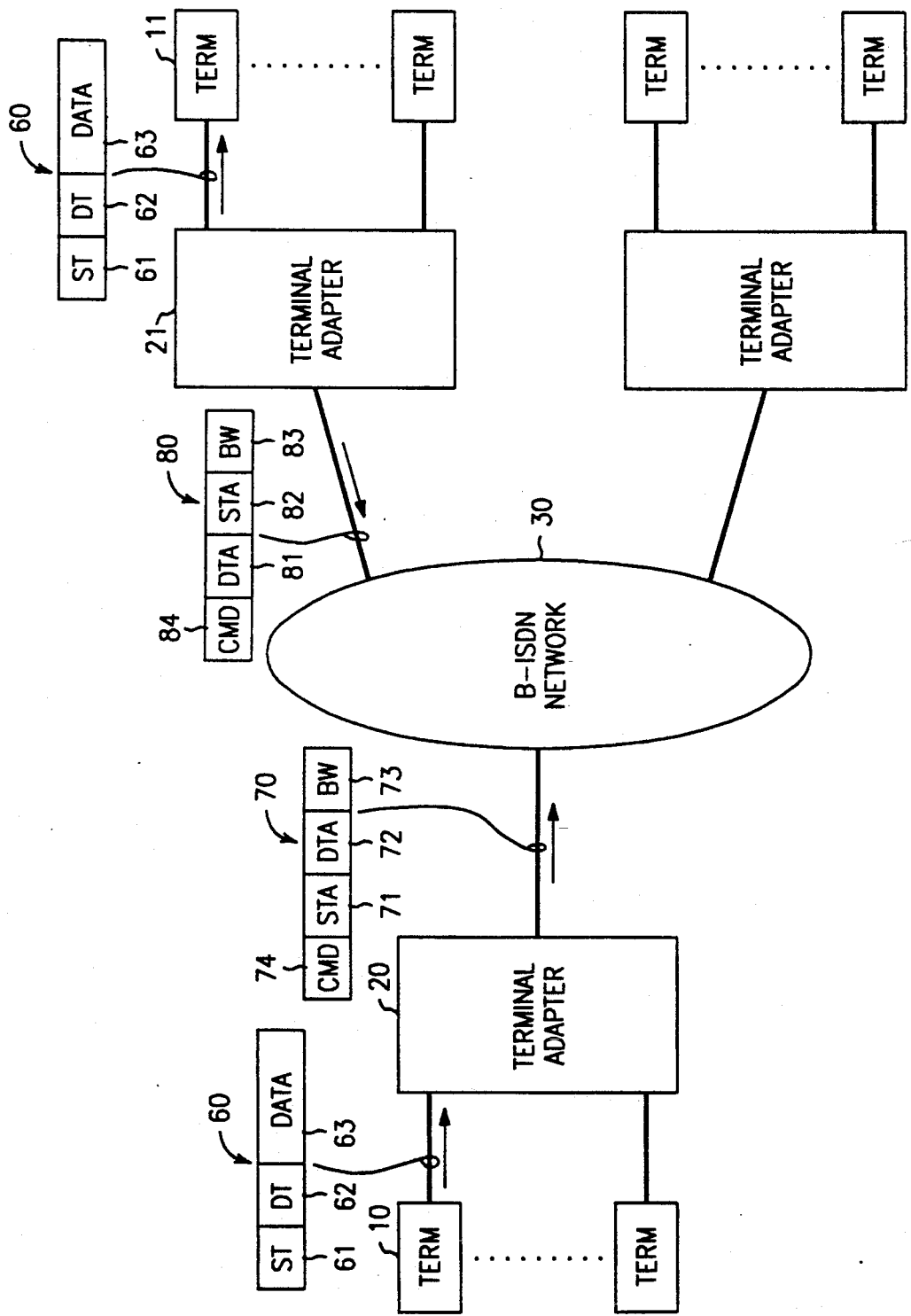
FIG. 1 illustrates an illustrative embodiment of the invention wherein a group of terminal adapters are connected to a broadband ISDN network for communicating messages between terminals connected to the terminal adapters.

FIG. 1 illustrates the operation of an exemplary embodiment of the invention. A broadband ISDN network 30 is used for interconnecting terminal adapters 20,21, . . . Each of the terminal adapters is connected to a group of terminals such as terminal 10 and terminal 11. The function of the broadband ISDN network is to provide a facility for switching data cells among the connected terminal adapters. Each terminal adapter is connected to the network by an optic fiber facility. Data is sent over these optic fiber facilities using a standard protocol known as the asynchronous transfer mode (ATM) wherein a plurality of individual data cells, each of which may contain data for a different message, are collected to form a data frame. At intermediate nodes within the network 30, individual cells are switched such that cells destined for data terminals 10,11, . . . , are transmitted to their corresponding adapters and are transmitted over that final fiber optic link.

Figure 2:
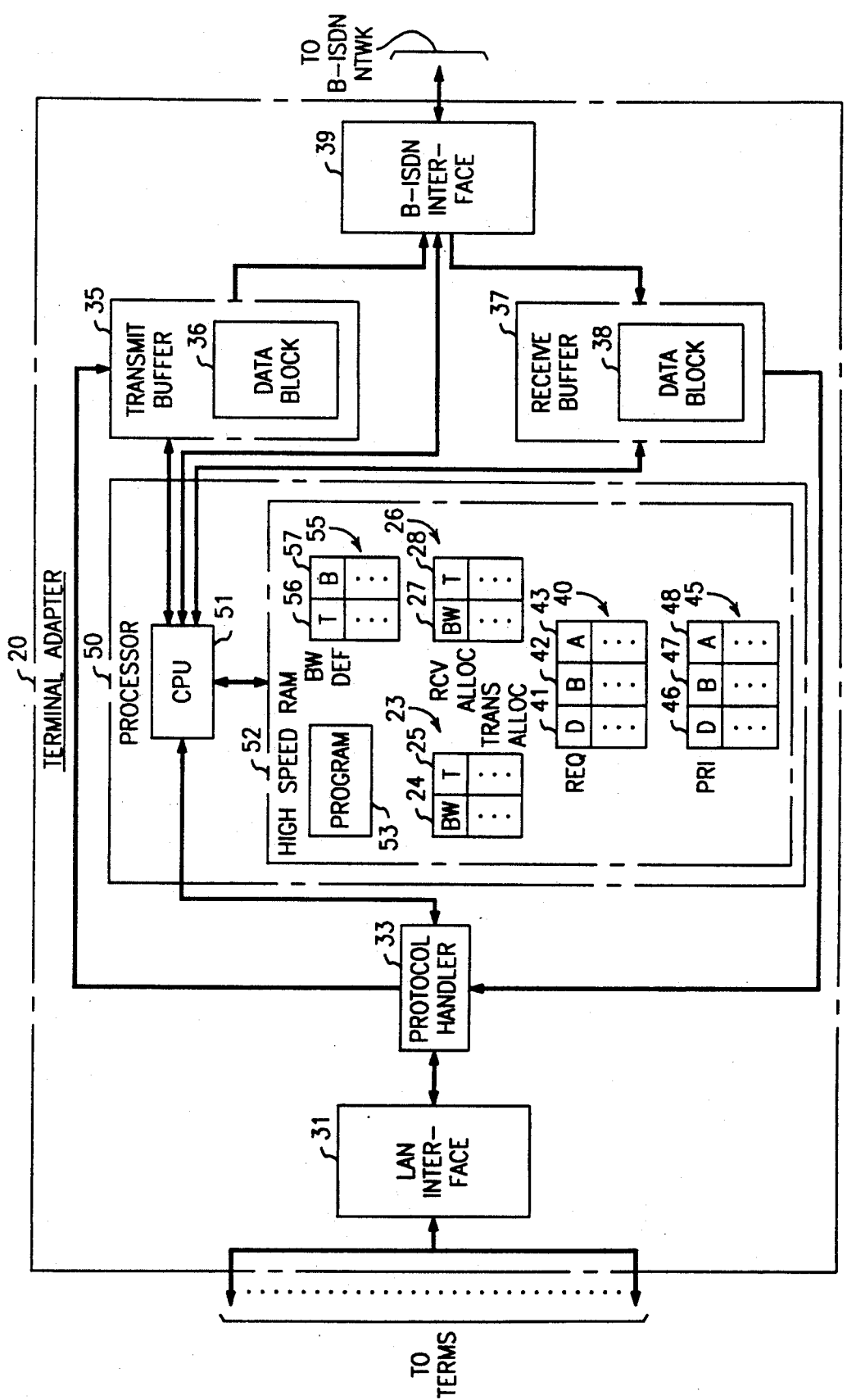
FIG. 2 is a block diagram of the terminal adapter of FIG. 1.

The terminal adapter is shown in FIG. 2. Each terminal adapter is controlled by processor 50 comprising a central processing unit 51 and a high speed random access memory (RAM) 52. The terminal adapter comprises a local area network (LAN) or host computer interface 31 for communicating data from/to the terminals 10, . . . , connected to terminal adapter 20. The LAN or host computer interface 31 is connected to a protocol converter 33 for communicating requests with processor 50 and data messages with transmit buffer 35 and receive buffer 37. The transmit and receive buffers, each of which contain a plurality of data blocks such as 36 and 38, respectively, communicate with a B-ISDN interface 39 for communicating with the B-ISDN network 30. The interface 39 implements the processing required to generate ATM cells, segment data blocks, and reassemble data from the cells. It maintains the optic fiber transmission and derives clocking from the network. The interface 39 constructs messages 36 in memory 35 from cells arriving from the fiber, and segments messages 38 into cells for transmission on the fiber. More than one message is processed at one time because calls from different messages are interleaved. After CPU 51 constructs a message in memory 35, it instructs interface 39 to transmit the message by writing a block identifier into a buffer read by the interface 39. Similarly, when the interface 39 completes construction of the message, it writes a block identifier into a buffer read by CPU 51. The interface passes on verified and correct data into the receive buffer 37. The processor 50 controls all TA functions such as table maintenance, scheduling the sending of requests, and performs the operations, administration and maintenance functions for the TA.

If terminal 10 connected to terminal adapter 20 wishes to transmit a message to terminal 11 connected to terminal adapter 21 then terminal 10 sends the message 60 comprising an identification of the sending terminal 61, the destination terminal 62, and data of the message including the requested bandwidth 63 to terminal adapter 20. Terminal adapter 20 first determines the bandwidth required or appropriate for the transmission of the data message to terminal 11 by consulting table 55 which defines the transmitting bandwidth 57 of each terminal 56. Suppose that the correct bandwidth for the transmission of this data message is 24 megabits/second. Terminal adapter 20 then sends message 70 over broadband ISDN network 30 to terminal adapter 21. Message 70 comprises an identification of the sending terminal adapter 71, the destination terminal adapter 72, the requested bandwidth for the transmission 73, and a command 74, in this case, a request to allocate command. Terminal adapter 21 responds to this message by checking its own allocated input bandwidth to determine if 24 megabits/second of bandwidth are still available. If so, it allocates 24 megabits of bandwidth and sends a confirmation message 80 over the B-ISDN network 30 to terminal adapter 20. The confirmation message includes the destination terminal adapter identification 81, source terminal adapter identification 82, the allocated bandwidth 83, and a command 84, in this case, a report that the bandwidth has been allocated. This allocated bandwidth may be less than the requested bandwidth if the destination TA is heavily loaded. Thereafter, the data message 60 is sent from terminal adapter 20 to terminal adapter 21 over the broadband ISDN network 30 at the allocated bandwidth of, for example, 24 megabits/second as determined by the response of the destination TA. Terminal adapter 21 receives the message and then passes the data message 60 to the connected destination terminal 11. After the data message 60 has been sent, the 24 megabits of bandwidth are deallocated and made available in the transmitting bandwidth of terminal adapter 20 and the receiving bandwidth of terminal adapter 21. The deallocation process is the same as the allocation process, comprising a deallocation in the sending terminal adapter 20, a deallocation message similar to message 70 to the receiving terminal adapter 21, a deallocation of the bandwidth in terminal adapter 21, and a return message similar to message 80 confirming the deallocation.

Each terminal adapter keeps track of the allocated bandwidth for receiving and for transmitting. As a result, multiple messages may be transmitted and received simultaneously in each terminal adapter provided that the sum of the allocated bandwidths of these messages does not exceed the transmission and reception capability of the access to the B-ISDN network. This sum including bandwidth permanently allocated for signaling, is audited and checked before each allocation.

Each terminal adapter, such as 20, maintains a table 23 of allocated bandwidths 24 and associated terminals 25 for transmitting and a similar table 26 of allocated bandwidths 27 and associated terminals 28 for receiving. This table is checked to determine if bandwidth is available for allocation, and, if so, the allocation is entered in the table when made.

When a request to transmit is received in the terminal adapter an entry is made in a request file 40 of transmitting terminal adapter 20. This entry comprises segment 41 identifying the destination terminal adapter, segment 42 identifying the amount of requested bandwidth, and segment 43 for keeping track of the age of the request. If sufficient transmitting bandwidth is not available at the sending terminal adapter 20 or receiving bandwidth is not available at destination terminal adapter 21, the next entry in the request file 40 of terminal adapter 20 is examined to determine the next message that is to be sent. For each entry in the request file, repeated attempts are made to allocate transmitting bandwidth at the sending terminal adapter and receiving bandwidth at the destination terminal adapter. When one of these attempts is successful, then transmission between the sending terminal adapter and destination terminal adapter is established, the request is cleared from the file, and the message is sent. If attempts to allocate this bandwidth are not successful at the sending terminal adapter, then after a first critical time the request is removed from the request file and is placed in priority file 45 which identifies the destination (segment 46), the bandwidth (segment 47), and the age (segment 48). When bandwidth is made available as a result of the completion of sending a message in sending terminal adapter 20, then the priority file is first checked to see if there are any requests in the priority file since such requests will be accepted first.

If a sending terminal adapter has messages in the request file, it will poll the receiving terminal adapters to determine which ones have the needed bandwidth and will transmit messages to all receiving terminal adapters for which there is available bandwidth, subject to availability of bandwidth on transmission facilities to the data network 3 in the sending terminal adapter. Each adapter has a limit of total bandwidth and a list of allocated bandwidths. If the difference between the total and the sum of the list is equal to or greater than the requested or needed bandwidth, that bandwidth is available. If there is any message in the priority file, the terminal adapter will concentrate on sending that message as soon as possible without concern for messages in the request file. Subsequently, if no bandwidth is allocated in the sending and destination adapters after a second critical period of time, then the message is deleted from buffers in sending terminal adapter 20; this condition is indicative of sending terminal adapter overflow.

If sending terminal adapter bandwidth has been allocated but the destination terminal adapter has not allocated bandwidth at the time of the first critical timeout, then all entries in the priority file 45 all of whose ages exceed that critical period of time, repeated requests for bandwidth allocation are transmitted to the destination terminal adapter. If the destination terminal adapter allocates bandwidth before the second critical period of time, then transmission is enabled between the two terminal adapters and the message goes through. If bandwidth has not been allocated by that second critical time indicating destination terminal adapter overflow, then the message is deleted in the sending terminal adapter.

Figure 3:
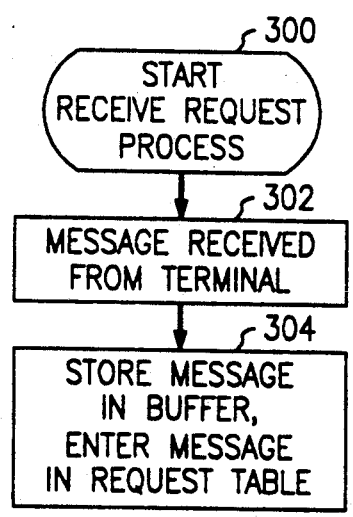

FIGS. 3-8 are flow charts of processes executed in the transmitting terminal adapter (FIGS. 3-7) and the receiving terminal adapter (FIG. 8). FIG. 3 illustrates the process executed in the terminal adapter when a message is received. The message is received from the terminal (action block 302). The message is then stored in a buffer of the terminal adapter (transmit buffer 35) and entered in the message request table 40 (action block 304).

Figure 4:
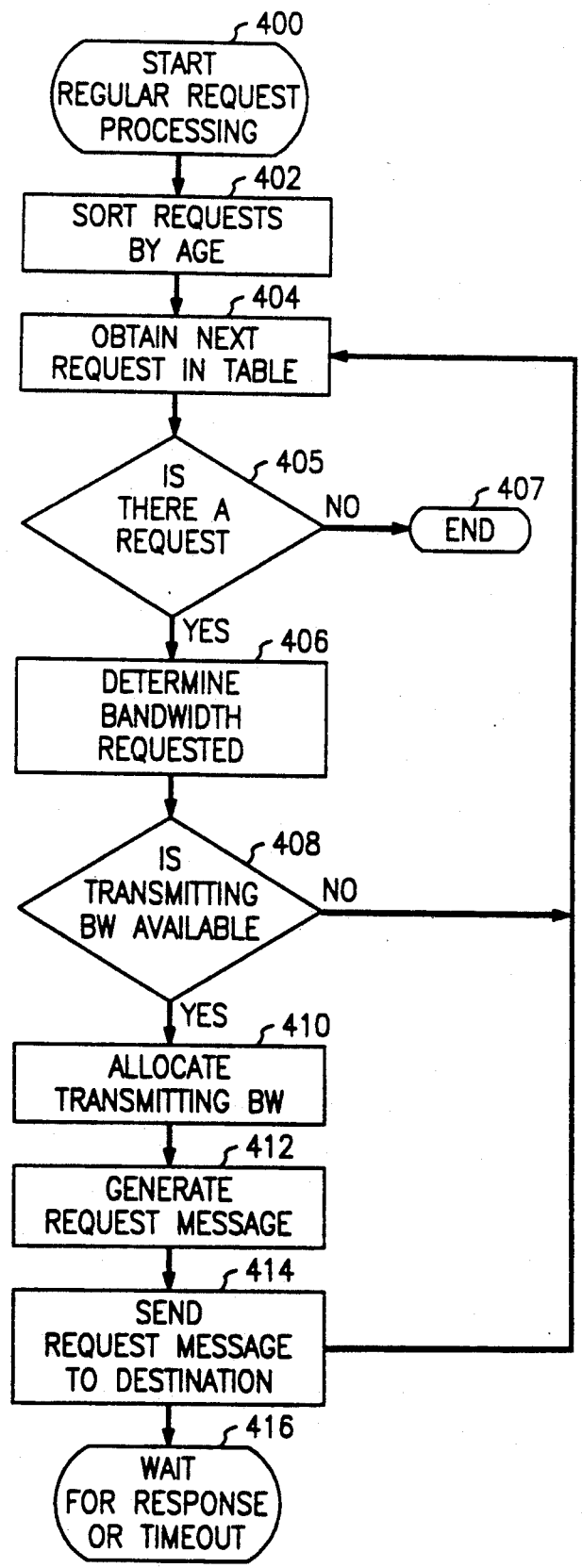

The processing of all entries in the request hopper is illustrated in FIG. 4 which describes the request processing function. The process is started (action block 400). The requests are sorted by age (action block 402) so that the oldest requests are treated first. The program then executes a loop involving blocks 404-414 to process all requests in the table. The loop begins in block 404 in which the next request in the table is obtained (if block 404 is entered from block 402, then the next request in the first request). Test 405 determines whether there is a request in order to terminate the loop at the appropriate time. If not, the loop is ended (block 407). If there is a request the amount of bandwidth required to honor the request is determined (action block 406). In test 408, a check is made whether transmitting bandwidth requisite for meeting the requirements determined in action block 406 is available. This test compares the amount of transmitting bandwidth already allocated with the total amount of transmitting bandwidth available and if the difference equals or exceeds the determined bandwidth, then transmitting bandwidth is available and is allocated (action block 410). If not, the next request in the table is processed (action block 404). If transmitting bandwidth has been allocated, then a request message is generated (action block 412) and sent to the destination terminal adapter (action block 414). The transmitting terminal adapter then enters a wait state from the point of view of the particular data message for which bandwidth has just been allocated (wait state indicator 416) and proceeds to process other requests in the request table by entering action block 404 previously described; the transmitting terminal adapter completes the work, started by transmitting the request message (block 414), by performing the processing described in FIG. 5.

Figure 5:
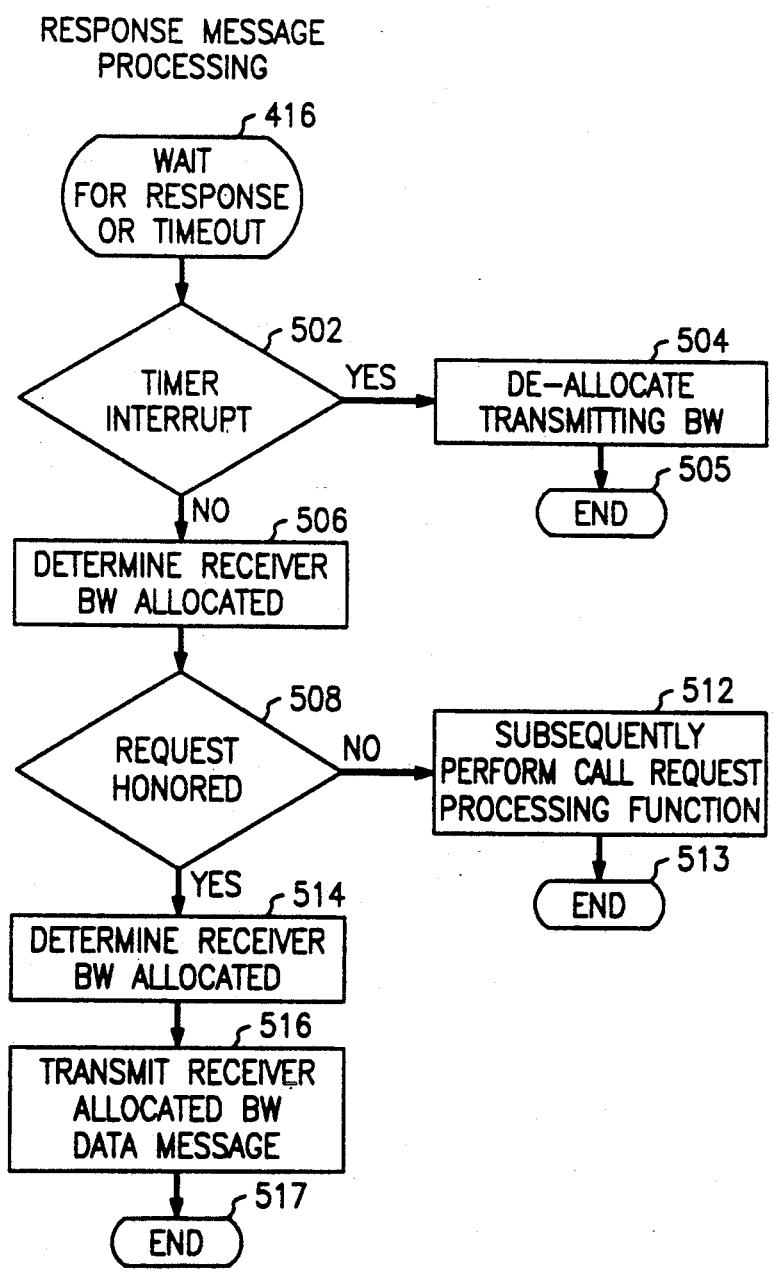

FIG. 5 is a flow diagram illustrating the operations performed in the terminal adapter in processing response messages for the request file requests. The terminal adapter is in the wait state 416 (entered in the flow diagram of FIG. 4) and emerges from this wait state either by a timer interrupt or by receiving a response message. When the terminal adapter leaves the wait state test 502 checks whether it left the wait state through a timer interrupt. If so, then it is assumed that the request message was lost and attempts to transmit the corresponding data message on the basis of the original request from the terminal are abandoned and the bandwidth previously allocated for this purpose is deallocated (action block 504). If a response message has been received (action block 506) then a test 508 is used to determine whether the request has been honored. If not, then the transmitting bandwidth previously allocated in the transmitting terminal adapter is deallocated (action block 504) and the corresponding request from the terminal will subsequently be reprocessed at first in the request processing of FIG. 4 and later in the priority request processing of FIG. 7. At some subsequent time, request processing is performed (action block 512). If the request has been honored as indicated by the positive output of test 508, then the terminal adapter determines how much receiver bandwidth was allocated by the receiving terminal adapter. As will be seen with reference to the discussion of FIG. 8 the receiver terminal adapter has the option of allocating slightly less than the requested bandwidth. The amount of bandwidth allocated by the receiving terminal adapter is determined in action block 514. The data message is then transmitted (action block 516) at the bandwidth allocated by the receiving terminal adapter.

Figure 6:
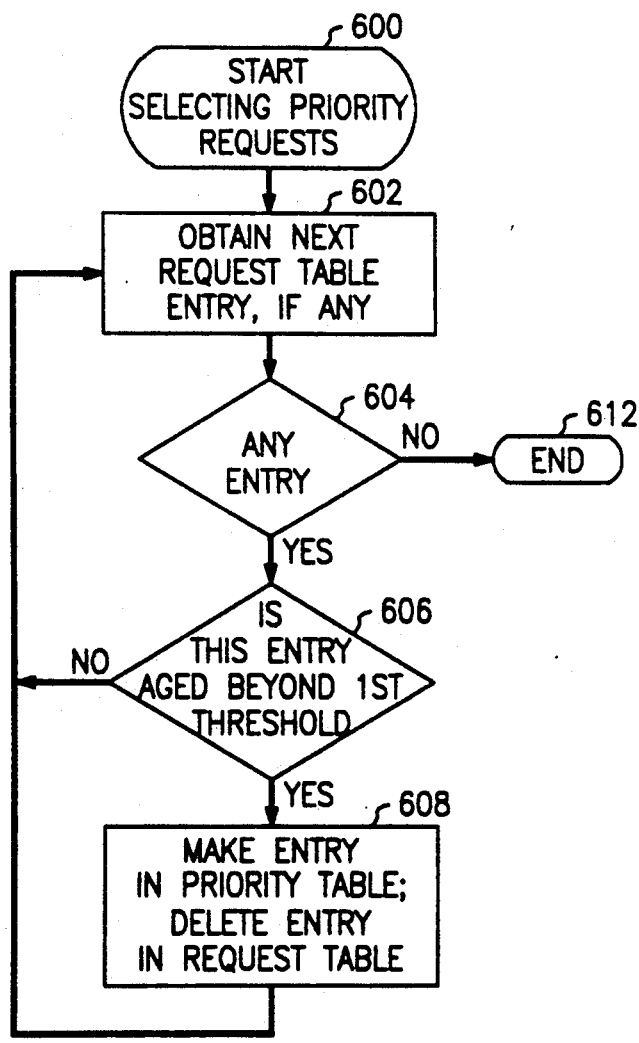

FIG. 6 is a flow chart which illustrates the process of selecting priority requests. The process is started (action block 600) and the next request table entry, if any, is obtained. Test 604 tests whether there is such an entry and if so whether this entry is aged beyond a first threshold. If so, then the entry is moved to the priority table and deleted from the request table (action block 608) and the next entry in the request table is obtained (action block 602). If the entry being examined is not aged beyond the first threshold, a negative result of test 606, then the next request table entry is obtained (action block 602). A negative result of test 604 indicates the absence of further entries in the table, and the process is complete (end process indicator 612).

Figure 7:
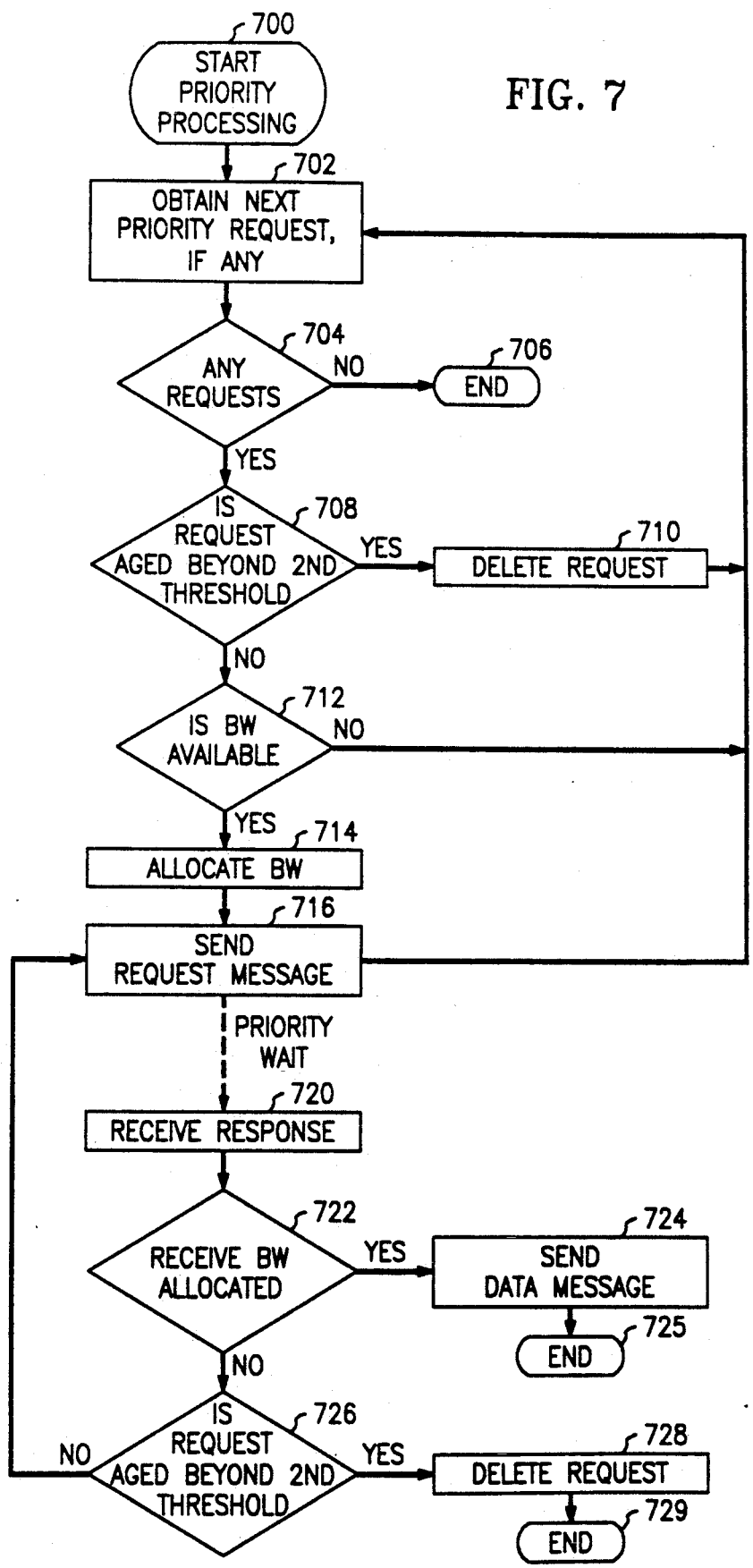

FIG. 7 is a flow diagram of the actions performed in processing priority requests. Priority requests are those which are in the priority table 45. These requests have aged by an amount greater than a first threshold. Also, if any entry in the priority table ages beyond the second threshold, then the attempt to send the data message corresponding to the request is abandoned and the terminal must initiate a new request to have that data message sent.

The process is started (action block 700) and the next request in the reserve table is obtained (action block 702). The priority process is entered more frequently than the request process. If action block 702 is entered from the start block 700, then the next request is, of course, the first request. Test 704, required to terminate the loop, tests if any priority request was obtained in action block 702. If not, then the priority processing process is completed for the time being (end block 706). If there is a request, then test 708 checks whether the request is aged by more than the second threshold. If so, then the priority request is deleted (action block 710) and the next priority request is examined. If the request is aged by less than the second threshold, a test is made whether transmitting bandwidth on transmission facilities to the data network 30, is available (test 712). If not, the next priority request is examined. If transmitting bandwidth is available that bandwidth is allocated (action block 714) and a request message is sent (action block 716). Action block 716 has two outputs, the first for continuing the processing of priority requests, and the second for further processing the priority request for which bandwidth has just been allocated. The second output begins with a priority wait from the point of view of the particular data message for which bandwidth has just been allocated. Priority request processing continues until a priority wait has been completed. The wait state is terminated when a response is received (action block 720). If the response indicates that receive bandwidth has been allocated (test 722), then the data message is sent (action block 724). If receive bandwidth has not been allocated (negative result of test 722) then test 726 checks to see whether the priority request has now aged beyond the second threshold. If so, the request is deleted (action block 728) with a result similar to that previously described with respect to action block 710. If the request has not aged beyond the second threshold, then the request message is sent again (action block 716). The result of the processing of FIG. 7 is that repeated attempts are made to allocate transmitting bandwidth for requests in the priority table and these attempts supersede any attempt to allocate bandwidth for request entries in the request table; that for any entries in the priority table for which transmit bandwidth has been allocated, repeated request messages are sent to the receive terminal adapter to attempt to allocate receive bandwidth therein; and that for any messages for which transmit and receive bandwidth have not been allocated by the end of the second threshold interval, attempts to transmit these messages based on the original request from the terminal are abandoned and these data messages are subsequently transmitted only in response to a new request.

FIG. 8 illustrates the receive process performed in the terminal adapter. The specific embodiment of this invention is arranged so that the receive terminal adapter does not allocate bandwidth unless and until bandwidth has been allocated in the transmitting terminal adapter. This has the advantage of preventing an overloaded receive terminal adapter from backing up messages in many sending terminal adapters, or of preventing sending terminal adapters from deallocating bandwidth before the receiving terminal adapter allocates that bandwidth. The process begins in the receive terminal adapter when a bandwidth request message is received (action block 802). In test 804, a check is made whether the receive bandwidth is available. This check is made by comparing the amount of unallocated bandwidth with the total bandwidth available in the receiving terminal adapter and verifying if the difference equals or exceeds the requested bandwidth words, if for, example, the receiving terminal adapter has 10 megabits/sec. of bandwidth and 9 megabits have already been allocated, then one megabit is unallocated and this one megabit is compared with a requested bandwidth. If the requested bandwidth is one megabit or less, then bandwidth is available; if the requested bandwidth is more than one megabit, then bandwidth is not available. If the bandwidth is available (positive outcome of test 804) then the receiving bandwidth is allocated (action block 814) and a message is sent to the transmitting terminal adapter allocating that bandwidth (action block 816). If bandwidth is not available (negative result of test 804) then test 806 checks whether some predetermined fraction of the requested bandwidth is available. Simulations have shown that a reasonable value of the predetermined fraction might be, for example, three-quarters or more. The exact fraction can be set on the basis of experience and/or on the basis of simulations subsequently augmented by experience in the field. If this predetermined fraction of requested bandwidth is available, then a message is sent to the transmitting terminal adapter specifying the amount of bandwidth allocated for the requested data message (action block 810) and this amount of bandwidth is allocated in the receiving terminal adapter (action block 812). If the amount of bandwidth available is less than that predetermined fraction of the requested bandwidth, then a message is sent to the transmitting terminal adapter indicating that no bandwidth is available (action block 808). The response to the messages sent in action blocks 808 and 810 have been previously described with respect to actions performed following test 508 (FIG. 5) and action block 720 (FIG. 7).

If a terminal is either deliberately made unavailable for maintenance or is discovered by the serving terminal adapter to be faulty, then the serving terminal adapter notifies all other terminal adapters of the unavailability of that terminal. Messages to unavailable terminals are blocked at the transmitting terminal adapters which have been informed of the unavailability of such terminals. In the special case wherein messages indicating unavailability cross with messages requesting allocation of bandwidth, bandwidth is not allocated and during the next attempt the sending terminal adapter will recognize that the destination terminal is unavailable and will block the messages.

This arrangement allows temporary fluctuations in data traffic to be handled smoothly without requiring data entities to be retransmitted. In general, the size of the data entity which must be retransmitted is a function of the protocol of the sending and destination and terminals, and is many cells long. Thus, any transmission arrangement which allows an occasional random Asynchronous Transfer Mode (ATM) frame to be lost forces the retransmission of many such frames and therefore causes a snowballing of a minor temporary overload condition. By controlling transmission over the broadband data network so that transmission is only possible when both source and destination bandwidth is available, such snowballing is avoided.

Alternative schemes for throttling transmission have been used in other networks. In one such scheme, the size of the queues at the destination terminal or at some destination data concentrator is monitored and if the size becomes too great then messages are sent to the sources of the data message to cut back on transmission. The trouble with this type of arrangement is that in a broadband ISDN network, the transmission rate is so high that by the time a message is received to lower the transmission rate, the queues at the destination have experienced overflow.

In this embodiment each terminal may address 255 other terminals. The network is limited to interconnecting 256 such terminals because only one byte is allocated to identifying the destination terminal. In a more general application, the identifying field can be as large as the combination of the ATM address label virtual circuit identifier (VCI) (20 bits) and the message identifier (MID) (14 bits) which would expand the number of possible terminals to $2^{34}$ (16 billion), a number far in excess of any conceivable need.

While this description has concentrated on bandwidth as the negotiated resource, other limiting resources, such as memories in the terminal adapters, and time to transmit a message can also be negotiated in a similar way. For example, allocation of bandwidth for a very long message might be deferred if the load is above a threshold.

While in this embodiment, requests are immediately entered in the request file, it is also possible to enter them in the request file only after making a first unsuccessful attempt to allocate bandwidth at the source and destination adapters.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. In a data network comprising one or more intermediate nodes, a method of allocating resources for transmission of data from a transmitting terminal connected to a transmitting ingress facility of said network to a receiving terminal connected to a receiving egress facility of said network, comprising the steps of:
    determining, in said ingress facility, whether an amount of packet switching bandwidth required for the transmission of the data from the transmitting terminal to the receiving terminal is available at the transmitting terminal ingress facility to said network;
    if said amount of packet switching bandwidth is available at the ingress facility, allocating said amount of bandwidth to the transmitting terminal;
    if said amount of packet switching bandwidth is available at the ingress facility, transmitting a request message, to allocate said amount of bandwidth, from said ingress to said egress facility;
    responsive to said request message, determining, in said egress facility, whether said amount of packet switching bandwidth is available at the receiving terminal egress facility from said network;
    if said amount of packet switching bandwidth is available at the egress facility, allocating said amount of bandwidth in said egress facility to the receiving terminal; and
    if said allocating steps have been executed successfully, transmitting data at the packet switching bandwidth allocated in said allocating steps from said ingress facility over ones of said intermediate nodes to said egress facility without checking for available packet bandwidth in intermediate nodes prior to commencement of said transmitting.

2. In a data network comprising one or more intermediate nodes, a method of allocating resources for transmission of data from a transmitting terminal connected to a transmitting ingress facility of said network to a receiving terminal connected to a receiving egress facility of said network, comprising the steps of:
    determining, in said ingress facility, whether an amount of bandwidth required for the transmission of the data from the transmitting terminal to the receiving terminal is available at the transmitting terminal ingress facility to said network;

if said amount of bandwidth is available at the ingress facility, allocating said amount of bandwidth to the transmitting terminal;

if said amount of bandwidth is available at the ingress facility, transmitting a request message, to allocate said amount of bandwidth, from said ingress to said egress facility;

responsive to said request message, determining, in said egress facility, whether said amount of bandwidth is available at the receiving terminal egress facility from said network; and if said amount of bandwidth is available at the egress facility, allocating said amount of bandwidth in said egress facility to the receiving terminal;

if said amount of bandwidth is not available at the ingress facility, or is not available at the egress facility, recording a request for the amount of bandwidth at an ingress controller for the transmitting terminal;

if said allocating steps have been executed successfully, transmitting data at the packet switching bandwidth allocated in said allocating steps from said ingress facility over ones of said intermediate nodes to said egress facility without checking for available packet bandwidth in intermediate nodes prior to commencement of said transmitting.

3. In a data network, a method of allocating resources for transmission of data from a transmitting terminal connected to a transmitting ingress facility of said network to a receiving terminal connected to a receiving egress facility of said network, comprising the steps of:

determining, in said ingress facility, whether an amount of bandwidth required for the transmission of the data from the transmitting terminal to the receiving terminal is available at the transmitting terminal ingress facility to said network;

if said amount of bandwidth is available at the ingress facility, allocating said amount of bandwidth to the transmitting terminal;

if said amount of bandwidth is available at the ingress facility, transmitting a request message, to allocate said amount of bandwidth, from said ingress to said egress facility;

responsive to said request message, determining, in said egress facility, whether said amount of bandwidth is available at the receiving terminal egress facility from said network; and if said amount of bandwidth is available at the egress facility, allocating said amount of bandwidth in said egress facility to the receiving terminal;

if said amount of bandwidth is not available at the ingress facility, or is not available at the egress facility, recording a request for the amount of bandwidth at an ingress controller for the transmitting terminal;

recording, in said ingress controller, data defining the destination, the amount of bandwidth, and data identifying a time of the request.

4. The method of claim 3 further comprising the step of:

periodically checking for requests for bandwidth in the recorded data and repeating attempts to allocate said requested bandwidth in an ingress controller for said receiving terminal and an egress controller for said transmitting terminal.

5. The method of claim 4 further comprising the steps of:

separately recording all requests whose age exceeds a predetermined threshold; and attempting to allocate bandwidth to the separately recorded requests on a priority basis.

6. The method of claim 5 wherein said step of attempting to allocate comprises:

7. The method of claim 1 wherein the step of determining whether said amount of bandwidth is available at the egress comprises:

sending a request message from an ingress controller for said transmitting terminal to an egress controller for said receiving terminal;

responsive to receipt of the request message, checking for available receive bandwidth at the egress facility; and sending a message from the egress controller to the ingress controller reporting on the result of the checking step.

8. The method of claim 7 further comprising:

if said checking step determines that said amount of bandwidth is available, allocating said amount of bandwidth.

9. In a data network, a method of allocating resources for transmission of data from a transmitting terminal connected to a transmitting ingress facility of said network to a receiving terminal connected to a receiving egress facility of said network, comprising the steps of:

determining, in said ingress facility, whether an amount of bandwidth required for the transmission of the data from the transmitting terminal to the receiving terminal is available at the transmitting terminal ingress facility to said network;

if said amount of bandwidth is available at the ingress facility, allocating said amount of bandwidth to the transmitting terminal;

if said amount of bandwidth is available at the ingress facility, transmitting a request message, to allocate said amount of bandwidth, from said ingress to said egress facility;

responsive to said request message, determining, in said egress facility, whether said amount of bandwidth is available at the receiving terminal egress facility from said network; and if said amount of bandwidth is available at the egress facility, allocating said amount of bandwidth in said egress facility to the receiving terminal;

wherein the step of determining whether said amount of bandwidth is available at the egress comprises:

sending a request message from an ingress controller for said transmitting terminal to an egress controller for said receiving terminal;

responsive to receipt of the request message, checking for available receive bandwidth at the egress facility; and sending a message from the egress controller to the ingress controller reporting on the result of the checking step;

wherein the checking step further comprises:

if all of said amount of bandwidth is not available at the egress facility, but at least a predetermined fraction of said amount of bandwidth is available at the egress facility, allocate the at least a predetermined fraction; and the sending step comprises:

sending a response message to the ingress controller reporting how much bandwidth was allocated.

10. The method of claim 1 wherein an ingress/egress controller for said transmitting terminal and an ingress/egress controller for said receiving terminal each comprise a terminal adapter for receiving data from and transmitting data to a plurality of connected terminals.

11. The method of claim 1 wherein said data network is a broadband ISDN network.

12. In a data network, a method of allocating resources for transmission of data from a transmitting terminal connected to a transmitting ingress facility of said network to a receiving terminal connected to a receiving egress facility of said network, comprising the steps of:
- determining, in said ingress facility, whether an amount of bandwidth required for the transmission of the data from the transmitting terminal to the receiving terminal is available at the transmitting terminal ingress facility to said network;
- if said amount of bandwidth is available at the ingress facility, allocating said amount of bandwidth to the transmitting terminal;
- if said amount of bandwidth is available at the ingress facility, transmitting a request message, to allocate said amount of bandwidth, from said ingress to said egress facility;
- responsive to said request message, determining, in said egress facility, whether said amount of bandwidth is available at the receiving terminal egress facility from said network; and
- if said amount of bandwidth is available at the egress facility, allocating said amount of bandwidth in said egress facility to the receiving terminal;
- if said amount of bandwidth is not available at the ingress facility, or is not available at the egress facility, recording a request for the amount of bandwidth at an ingress controller for the transmitting terminal;
- recording, in said ingress controller, data defining the destination, the amount of bandwidth, and data identifying a time of the request;
- wherein the step of allocating bandwidth at an ingress controller for said transmitting terminal comprises:
- periodically sorting by age, requests for which transmit bandwidth has not been allocated; and
- attempting to allocate bandwidth for oldest requests first.

13. A terminal adapter, for connection to a data network comprising one or more intermediate nodes, comprising:
- a terminal interface for communicating between the adapter and a plurality of terminals;
- a network interface for communicating between the adapter and a data network;
- storage means for storing data messages receivable via the terminal interface from the terminals for transmission via the network interface over the network;
- storage means for data messages receivable via the network interface from the network for transmission via the terminal interface to the terminals; and
- processor means operative under the control of a program for controlling the following operations:
- determining whether an amount of bandwidth for transmitting a data message from a transmitting terminal to a receiving terminal via the terminal adapter is recorded as available;
- if said amount of bandwidth is available, allocating said amount of bandwidth to the transmitting terminal;
- sending a message via the network interface over the network to a destination terminal adapter connected to a destination terminal of the message requesting allocation of said amount of bandwidth; and
- responsive to receipt of a message from the destination terminal adapter confirming allocation of the amount of bandwidth for the reception of the data message, sending the data message from the storage means for messages receivable from the terminals via the network interface to the network over ones of said intermediate nodes selected by said network without checking for available packet bandwidth in intermediate nodes prior to commencement of said sending.

14. The terminal adapter of claim 13 wherein the terminal interface comprises:
- protocol handler means for interfacing between the two storage means and the data from and to the terminals.

15. The terminal adapter of claim 13 wherein the processor means comprises:
- storage means for storing requests to transmit messages and for storing data defining blocks of bandwidth allocated to transmit and receive messages over the network.

16. A method of allocating resources in a broadband ISDN network for transmission of data from a transmitting terminal connected to a transmitting ingress facility of said network to a receiving terminal connected to a receiving egress facility of said network, comprising the steps of:
- determining an amount of bandwidth required for the transmitting terminal;
- determining, in said ingress facility, whether the amount of bandwidth is available at a source terminal adapter, the source adapter connected to the network and the transmitting terminal;
- if the amount of bandwidth is available at the source adapter, allocating the amount of bandwidth to the transmitting terminal;
- if the amount of bandwidth is available at the source adapter, transmitting a request message, to allocate said amount of bandwidth, from said ingress to said egress facility;
- responsive to said request message, determining, in said egress facility, whether the amount of bandwidth is available at a destination terminal adapter, the destination adapter connected to the network and the receiving terminal;
- if the amount of bandwidth is available at the destination adapter, allocating the amount of bandwidth in said egress facility to the receiving terminal;
- if the amount of bandwidth is not available at the source adapter, or is not available at the destination adapter, recording in the source adapter, data defining the destination, the amount of bandwidth, and data identifying a time of a request for the amount of bandwidth;
- periodically checking for requests for bandwidth in the recorded data and repeating attempts to allocate said requested bandwidth in the source adapter and the destination adapter;
- separately recording all requests whose age exceeds a predetermined threshold; and
- attempting to allocate bandwidth to the separately recorded requests on a priority basis by transmitting repeated request messages to allocate bandwidth at the destination adapter;

wherein the step of determining whether bandwidth is available at the destination adapter comprises:

sending a request message from the source adapter to the destination adapter;

responsive to receipt of the request message, checking for available receive bandwidth at the destination adapter; and sending a message from the destination adapter to the source adapter reporting on the result of the checking step;

wherein the checking step comprises:

if the amount of bandwidth is not available at the destination adapter, but at least a predetermined fraction of the amount of bandwidth is available at the destination adapter, allocate the at least a predetermined fraction; and the sending step comprises:

sending a response message to the source adapter reporting how much bandwidth was allocated;

wherein the step of allocating at the source adapter comprises:

periodically sorting by age, requests for which transmit bandwidth has not been allocated; and attempting to allocate bandwidth for oldest requests first.

17. In a data network comprising one or more intermediate nodes, a method of allocating resources for transmission of data from a transmitting terminal connected to a transmitting ingress facility of said network to a receiving terminal connected to a receiving egress facility of said network, comprising:

determining, in said ingress facility, if adequate packet switching bandwidth for transmission of the data is available at said ingress facility having allocable packet switching bandwidth on a common transmission medium to the network, the ingress facility connected to the transmitting terminal, and determining, in said egress facility if adequate packet switching bandwidth for reception of the data is available at said egress facility having allocable packet switching bandwidth on a common transmission medium from the network, the egress facility connected to the receiving terminal; and when said adequate packet switching bandwidth is available at both the ingress facility and the egress facility, allocating said adequate packet switching bandwidth to said transmission of data over ones of said intermediate nodes selected by said network without checking for available packet bandwidth in intermediate nodes prior to commencement of said transmission of data.

18. The method of claim 17 further comprising:

transmitting said data after said adequate packet switching bandwidth is allocated.

19. A terminal adapter, for connection to a data network comprising one or more intermediate nodes, comprising:

means, responsive to a request to transmit a data message, for allocating transmit bandwidth;

means responsive to said request for transmitting a signaling message requesting allocation of receive packet switching bandwidth in another terminal adapter; and means responsive to receipt of a signaling message from said another terminal adapter confirming allocation of receive packet switching bandwidth for initiating transmission of said data message over ones of said intermediate nodes selected by said network without checking for available packet bandwidth in intermediate nodes prior to said initiating transmission.

20. A terminal adapter, for connection to a data network comprising one or more intermediate nodes, comprising:

means, responsive to receipt of a signaling message from another terminal adapter, for testing for availability of receive packet switching bandwidth;

means, responsive to said means for testing, for allocating said receive bandwidth if available and for transmitting a reply message for enabling or disabling transmission of a data message from said another terminal adapter over ones of said intermediate nodes selected by said network without checking for available packet bandwidth in intermediate nodes prior to said enabling.

21. The terminal adapter of claim 19 wherein said means responsive to receipt of a signaling message is further responsive, to receipt of a signaling message denying allocation of receive bandwidth, for recording a request for allocating said transmit bandwidth.

* * * * *

UNITED STATES PATENT AND TRADEMARK OFFICE
CERTIFICATE OF CORRECTION

PATENT NO. : 5,231,631

DATED : July 27, 1993

INVENTOR(S) : Rolfe E. Buhrke, Dennis L. DeBruler, Vikram Punj

It is certified that error appears in the above-identified patent and that said Letters Patent is hereby corrected as shown below:

Column 5, line 61, after "bandwidth" insert a comma.

Column 5, line 62, delete "3" and substitute --30,--.

Column 8, line 57, after "bandwidth" insert a period.

Column 8, line 57, before "words," insert --In other--.

Column 12, claim 6, after line 6, insert --sending repeated requests to allocate bandwidth to the egress controller.--.

Signed and Sealed this

Twenty-ninth Day of March, 1994

Attest:

BRUCE LEHMAN

*Attesting Officer*     *Commissioner of Patents and Trademarks*